(12) United States Patent
Fuellemann et al.

(10) Patent No.: US 8,342,315 B2
(45) Date of Patent: Jan. 1, 2013

(54) APPARATUS FOR CONVEYING PRODUCTS

(75) Inventors: Cyrille Fuellemann, Schaffhausen (CH); Daniel Schwarz, Unterstammheim (CH)

(73) Assignee: Robert Bosch GmbH, Stuttgart (DE)

( * ) Notice: Subject to any disclaimer, the term of this patent is extended or adjusted under 35 U.S.C. 154(b) by 270 days.

(21) Appl. No.: 12/736,615

(22) PCT Filed: Apr. 1, 2009

(86) PCT No.: PCT/EP2009/053856
§ 371 (c)(1),
(2), (4) Date: Oct. 22, 2010

(87) PCT Pub. No.: WO2009/130116
PCT Pub. Date: Oct. 29, 2009

(65) Prior Publication Data
US 2011/0042180 A1 Feb. 24, 2011

(30) Foreign Application Priority Data

Apr. 22, 2008 (DE) .......................... 10 2008 001 324

(51) Int. Cl.
*B65G 47/24* (2006.01)

(52) U.S. Cl. .................. 198/470.1; 198/464.2; 198/571; 198/576; 198/347.1

(58) Field of Classification Search .................. 198/431, 198/470.1–472.1, 449, 463.2, 464.1–464.3, 198/571, 576, 347.1
See application file for complete search history.

(56) References Cited

U.S. PATENT DOCUMENTS

| | | | |
|---|---|---|---|
| 4,135,619 A * | 1/1979 | Cerboni | 198/471.1 |
| 5,113,996 A | 5/1992 | Francioni | |
| 5,263,568 A | 11/1993 | Francioni | |
| 5,871,079 A * | 2/1999 | Nannini et al. | 198/377.04 |
| 6,474,462 B2 * | 11/2002 | Wipf et al. | 198/347.1 |
| 6,578,614 B1 * | 6/2003 | Loewenthal | 156/358 |
| 7,810,629 B2 * | 10/2010 | Kronseder et al. | 198/347.1 |
| 2003/0066733 A1 * | 4/2003 | Pattantyus-Abraham et al. | 198/339.1 |

FOREIGN PATENT DOCUMENTS

| | | |
|---|---|---|
| DE | 19654394 A | 7/1998 |
| DE | 10314807 A1 | 11/2003 |
| EP | 0769459 A1 | 4/1997 |

(Continued)

*Primary Examiner* — Mark A Deuble
(74) *Attorney, Agent, or Firm* — Michael Best & Friedrich LLP

(57) ABSTRACT

An apparatus for conveying products to a destination has a revolving conveyor chain embodied by entraining elements revolving along a first continuous track and have a certain chain pitch. A revolving conveying device is disposed with grippers arranged at a distance therebetween on the conveying device revolving around a second continuous track. A first zone of the first and second continuous track transfers products from the first continuous track on the conveyor chain to the second continuous track via the grippers. A second zone of the second continuous track delivers products from the grippers at the destination. A third zone of the first and second continuous track returns products not needed at the destination from the grippers on the second continuous track to the conveyor chain on the first continuous track. A distance traveled by the conveyor chain on the first continuous track from a transfer point of the products in the first zone to a return point in the third zone and a distance traveled by the grippers on the second continuous track from the transfer point of the products in the first zone to the return point in the third zone are chosen such that a phase shift amounting to a fraction of the chain pitch occurs between the conveyor chain and the gripper between the return point and the transfer point.

18 Claims, 1 Drawing Sheet

FOREIGN PATENT DOCUMENTS

| | | | |
|---|---|---|---|
| EP | 1048569 | A2 | 11/2000 |
| EP | 1216939 | A1 | 6/2002 |
| GB | 2241684 | A | 9/1991 |
| GB | 2256840 | A | 12/1992 |

\* cited by examiner

APPARATUS FOR CONVEYING PRODUCTS

CROSS-REFERENCE TO RELATED APPLICATION

This application is a 35 USC 371 application of PCT/EP2009/053856 filed on Apr. 1, 2009.

BACKGROUND OF THE INVENTION

1. Field of the Invention

The invention relates to an apparatus for conveying products to a destination.

2. Description of the Prior Art

From European Patent Disclosure EP A 1 048 569, an apparatus for putting together two components to make a product comprising the two components is known. The apparatus has a first conveyor for supplying the first component and a revolving second conveyor with first entraining elements for the first component and second entraining elements for the second component that is supplied at a supply station. The apparatus is equipped with optical sensors for monitoring the first components for intactness and for monitoring the correct placement of the second components. If a sensor indicates a flaw, the corresponding defective product is ejected laterally as a reject by means of an ejection lever.

From European Patent Disclosure EP A 1 216 939, an apparatus for conveying and temporarily storing products is known. The apparatus has a carousel arrangement, with grippers revolving in a first continuous track for temporarily transferring products, to be conveyed on a belt conveyor to a destination, and delivering the products to a reservoir with a second continuous track. The products can be removed from the reservoir by means of the grippers again and put back on the belt conveyor.

OBJECTS AND SUMMARY OF THE INVENTION

The object of the invention is to create an apparatus of the type defined at the outset which by simple means makes it possible, by returning them, for products not needed at the destination to be reused.

Another goal of the invention is to furnish a modularly constructed apparatus that is suitable for supplying products for packaging in high-speed packaging machines.

In a further goal of the invention, the apparatus is intended to be suitable for use in a continuous packaging process in which products, such as blister packs for tablets or patient information sheets, can be supplied to the packages and glued on.

An apparatus for conveying products to a destination, including a continuous conveyor chain having entraining elements revolving along a first continuous track and having a chain pitch, a revolving conveyor having grippers spaced apart on the conveyor from one another and revolving along a second continuous track, a first zone of the first and second continuous tracks for transferring products by means of the grippers of the conveyor chain from the first continuous track to the second continuous track, a second zone of the second continuous track for delivering products from the grippers at the destination, and a third zone of the first and second continuous tracks for returning products, not needed at the destination, by means of the grippers from the second continuous track onto the conveyor chain into the first continuous track, leads to attaining the object of the invention in that the distance of the conveyor chain on the first continuous track from a transfer point of the products in the first zone to a return point in the third zone and the distance of the grippers on the second continuous track from the transfer point of the products in the first zone to the return point in the third zone are selected such that between the conveyor chain and the gripper from the return point to the transfer point, a phase shift of a fraction of the chain pitch ensues.

Preferably, the second continuous track in the second zone extends selectively in one of two planes at staggered heights. For that purpose, the second continuous track is controlled by a sliding block and is adjustable in the second zone via a shunt.

The revolution of the conveyor chain and the revolution of the grippers are effected synchronously at the same speed via one drive mechanism each, and a common central drive mechanism with suitable gears is also possible.

BRIEF DESCRIPTION OF THE DRAWINGS

Further advantages, characteristics and details of the invention will become apparent from the ensuing description of preferred exemplary embodiments and in conjunction with the drawings, in which.

DESCRIPTION OF THE PREFERRED EMBODIMENT

Figure 1:
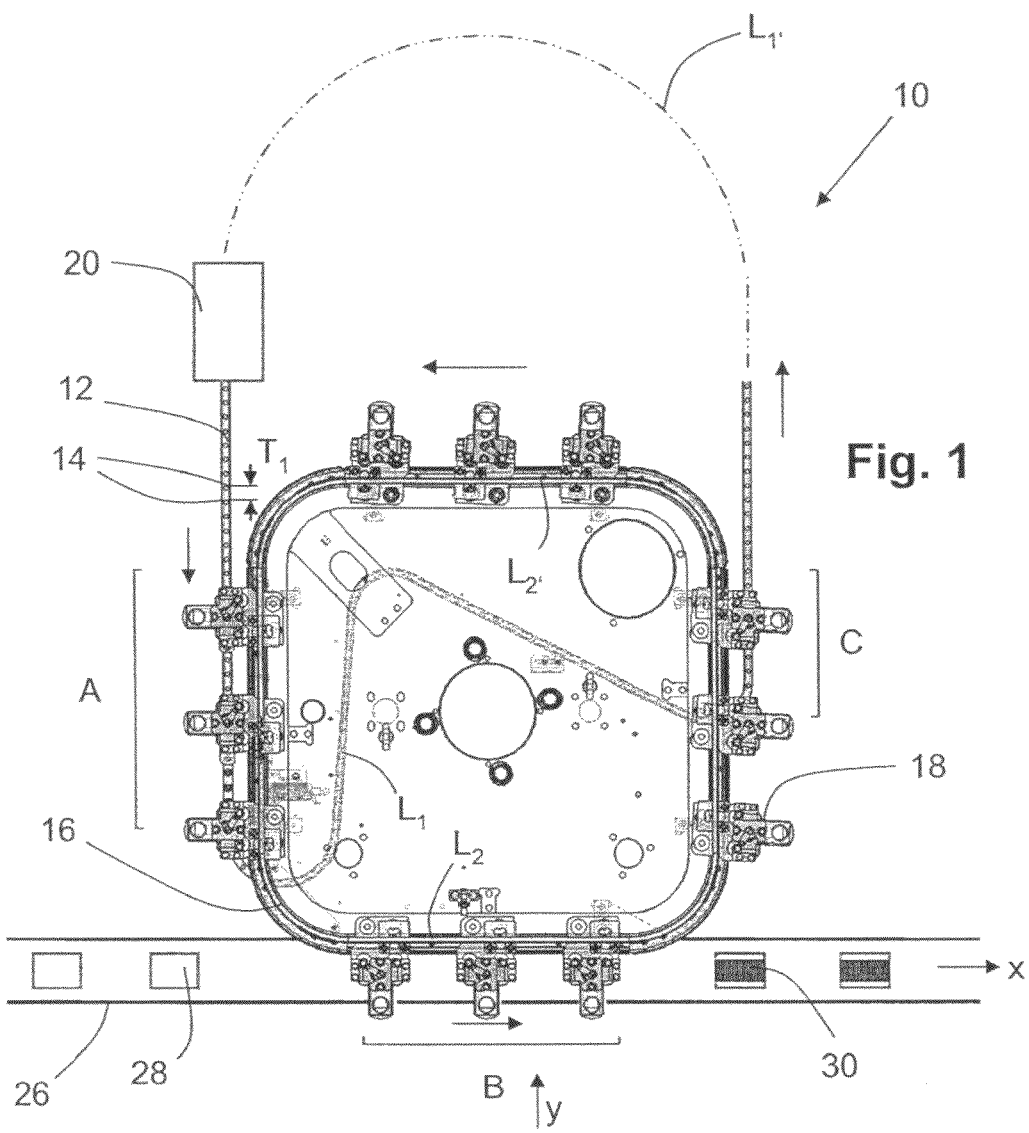
FIG. 1 shows a plan view of an apparatus according to the invention.
Figure 2:
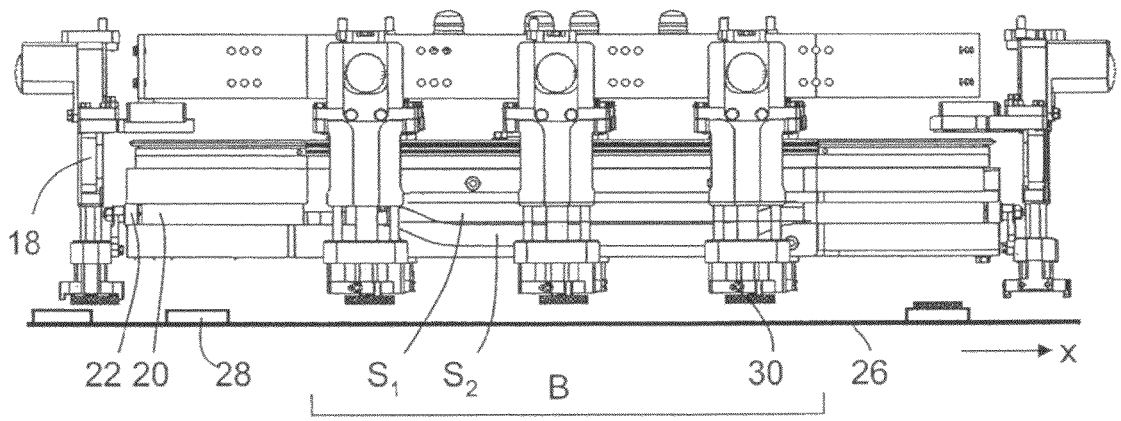
FIG. 2 shows a side view of the apparatus of FIG. 1 in the viewing direction y.

A conveyor apparatus 10 shown in FIGS. 1 and 2 has a first conveyor chain 12, revolving on a first continuous track $L_{1'}$, with entraining elements 14 and a chain pitch $T_1$, and a revolving second conveyor chain 16 with grippers 18, fixed to it and spaced apart from one another, revolving a second continuous track $L_{2'}$. Products are placed by a dispenser 20 between two each successive entraining elements 14 onto the conveyor chain 12, are received in a first zone A by means of the grippers 18 from the conveyor chain 12, and are guided to their destination into a second zone B downstream of the first zone A. Products not needed at their destination are carried onward by means of the grippers 18 into a third zone C, downstream of the second zone B, and are placed back on the conveyor chain 12 in the third zone and returned to the dispenser 20. Via an optical system, for instance, the dispenser 20, from returned products, recognizes interstices already occupied between adjacent entraining elements 14 and does not place any further product in those interstices.

The distance $L_1$ of the conveyor chain 12 on the first continuous track $L_{1'}$, from a transfer point of the products in the first zone A to a return point in the third zone (C), and the distance $L_2$ of the grippers 18 on the second continuous track $L_{2'}$, from the transfer point of the products in the first zone A to the return point in the third zone C, are selected such that between the conveyor chain 12 and the grippers 18 between the return point and the transfer point, a phase shift $\Delta T_1$ of a fraction of the chain pitch $T_1$ ensues. The phase shift $\Delta T_1$ is necessary because the products conveyed on the conveyor chain 12 are not located centrally between two entraining elements 14, but instead each product contacts the rear entraining element 14, that is, the one to the rear in terms of the conveying direction, and are transferred from that position by the grippers 18 in the zone A. The phase shift $\Delta T_1$ prevents the products, as a consequence of close tolerances, on deposition at the return point in the third zone C from mistakenly coming to rest on an entraining element 14. Typically, the phase shift $\Delta T_1$ is dimensioned such that the return products are deposited at the return point in the third zone C approximately centrally between adjacent entraining elements 14.

The distance $L_1$ of the conveyor chain 12 on the first continuous track $L_1$, from the return point in the third zone C to the transfer point of the products in the first zone A, and the distance $L_2$ of the grippers 18 on the second continuous track $L_2$, from the return point in the third zone C to the transfer point of the products in the first zone A, are selected accordingly such that the resultant phase shift $\Delta T_1$ between the conveyor chain 12 and the grippers 18 between the transfer point and the return point is rescinded.

To provide the continuous tracks of the conveyor chain 12 and grippers 18 with given factors appropriate for an optimal length, the phase-shifted forward and return lengths can be lengthened or shortened by at least one chain pitch.

The grippers 18 are embodied as vacuum grippers. The vacuum is activated each time the products are picked up from the conveyor chain 12 and deactivated after the products have been set down.

It can be seen from FIG. 2 that the grippers 18 are controlled in sliding block fashion via a guide peg 22, guided in a revolving guide groove 20, and in the second zone B they are guided either via a first guide groove segment $S_1$ at the same height as the revolving guide groove 20 or are lowered to a lower level via a lower second guide groove segment $S_2$ and at the end of this second guide groove segment $S_2$ then raised again to the level of the revolving guide groove 20. In the example shown, three grippers 18 in the second zone B are all located in the first guide groove segment $S_1$, and accordingly have not been lowered.

As shown in FIGS. 1 and 2, the grippers 18 in the second zone B are positioned via a conveyor device 26, moving in the same direction, of a packaging machine not shown in the drawings. Packaging blanks 28, for instance, are furnished on the conveyor device 26. Via the grippers 18 of the conveyor apparatus 10, blister packs 30 for tablets are brought to the packaging blanks 28 and glued to them. For that purpose, the furnished packaging blanks 28 are provided beforehand with a droplet of hot glue or melting adhesive, for instance. When the grippers 18 are lowered onto the second guide groove segment $S_2$, the blister packs 30 are set down onto the packaging blanks 28 and secured to them by means of pressure via the adhesive. The vacuum is deactivated in the gluing position. Blister packs 30 intended to be returned remain on the grippers 18, which pass through the second zone B via the first guide groove segment $S_1$ without being lowered.

To avoid rejects, it should be ensured in the event of a machine stoppage that packages already provided with hot glue or melting adhesive will still be glued to a product. Moreover, no products should be glued on if no packaging blank is present, for instance because the blank was already ejected in a preceding monitoring device.

The conveyor device 26—such as a transport chain with chain pitch—is subdivided for this purpose into segments that are provided with delivery devices that can be uncoupled. These delivery devices for instance comprise a short chain segment, disposed above the transport chain, that pushes the products "from above" from one segment to the next. Upon a machine stop, these delivery devices are uncoupled, so that the normally synchronously operating chain segments of the machine can now be operated independently, and the gluing processes that have been partly performed can still be brought to an end.

The products not glued on are deposited in the return passage back in the revolving conveyor chain 12 for the products and are reused in the next revolution. For that purpose, the shunt 24 is controlled such that the grippers pass through the upper sliding block path and are not lowered. In this first guide groove segment $S_1$, the vacuum of the gripper remains activated until the output position of the chain, so that the product is returned into the chain. The dispenser, such as a stacker, which equips the conveyor chain with products, recognizes that the corresponding chain pitch in the return is already occupied by a product, and does not dispense any further product into that chain pitch. The revolution of the grippers and the revolution of the chain is synchronous; that is, the grippers and the chain always move at the same speed.

The apparatus of the invention offers the following advantages:

- Fast movement for use for products in a continuous-operation, modularly constructed packaging machine.
- Products can be returned and shunted back into the process.
- Uncoupling the modules prevents packages that are already provided with spots of adhesive but into which no product has been glued from being rejected.
- High operating safety, since the products at the withdrawal point are grasped centrally at the rear chain pitch and at the output point, in the return instance, they are set down centrally between the chain pitch.
- Simple control technology; since the conveyor chain and the gripper revolutions run synchronously, individual servo drive mechanisms are unnecessary.

The foregoing relates to the preferred exemplary embodiment of the invention, it being understood that other variants and embodiments thereof are possible within the spirit and scope of the invention, the latter being defined by the appended claims.

The invention claimed is:

1. An apparatus for conveying products to a destination, comprising:
    a continuous conveyor chain, having entraining elements revolving along a first continuous track, and having a chain pitch;
    a revolving conveyor, having grippers, spaced apart on the conveyor means from one another and revolving along a second continuous track;
    a first zone of the first continuous track and the second continuous track for transferring products from the first continuous track on the conveyor chain to the second continuous track by means of the grippers;
    a second zone of the second continuous track for delivering products from the grippers at the destination;
    a third zone of the first continuous track and the second continuous track for returning products, not needed at the destination, by means of the grippers from the second continuous track onto the conveyor chain into the first continuous track, wherein the distance of the conveyor chain on the first continuous track from a transfer point of the products in the first zone to a return point in the third zone, and the distance of the grippers on the second continuous track from the transfer point of the products in the first zone to the return point in the third zone, are selected such that between the conveyor chain and the grippers from the return point to the transfer point, a phase shift of a fraction of the chain pitch results.

2. The apparatus as defined by claim 1, wherein the second continuous track in the second zone extends selectively in one of two planes at staggered heights.

3. The apparatus as defined by claim 2, wherein the second continuous track is controlled by a sliding block and is adjustable in the second zone via a shunt.

4. The apparatus as defined by claim 1, wherein revolution of the conveyor chain and revolution of the grippers are effected synchronously at a same speed.

5. The apparatus as defined by claim 2, wherein revolution of the conveyor chain and revolution of the grippers are effected synchronously at a same speed.

6. The apparatus as defined by claim 3, wherein revolution of the conveyor chain and revolution of the grippers are effected synchronously at a same speed.

7. The apparatus as defined by claim 4, wherein the revolution of the conveyor chain and the revolution of the grippers are effected via a common drive mechanism.

8. The apparatus as defined by claim 5, wherein the revolution of the conveyor chain and the revolution of the grippers are effected via a common drive mechanism.

9. The apparatus as defined by claim 6, wherein the revolution of the conveyor chain and the revolution of the grippers are effected via a common drive mechanism.

10. A use of an apparatus as defined by claim 1 for supplying products to a continuous-operation, modularly constructed packaging machine.

11. A use of an apparatus as defined by claim 2 for supplying products to a continuous-operation, modularly constructed packaging machine.

12. A use of an apparatus as defined by claim 3 for supplying products to a continuous-operation, modularly constructed packaging machine.

13. A use of an apparatus as defined by claim 4 for supplying products to a continuous-operation, modularly constructed packaging machine.

14. A use of an apparatus as defined by claim 5 for supplying products to a continuous-operation, modularly constructed packaging machine.

15. A use of an apparatus as defined by claim 6 for supplying products to a continuous-operation, modularly constructed packaging machine.

16. A use of an apparatus as defined by claim 7 for supplying products to a continuous-operation, modularly constructed packaging machine.

17. A use of an apparatus as defined by claim 8 for supplying products to a continuous-operation, modularly constructed packaging machine.

18. A use of an apparatus as defined by claim 9 for supplying products to a continuous-operation, modularly constructed packaging machine.

* * * * *